United States Patent [19]

Forbord et al.

[11] Patent Number: 5,161,074
[45] Date of Patent: Nov. 3, 1992

[54] FLEXIBLE RETAINER FOR CANTILEVERED MATRIX BOARD

[75] Inventors: Kent J. Forbord, Roseville; Mehdi S. Haidari, Eden Prairie, both of Minn.

[73] Assignee: Seagate Technology, Inc., Scotts Valley, Calif.

[21] Appl. No.: 632,150

[22] Filed: Dec. 21, 1990

[51] Int. Cl.$^5$ .............................................. G11B 5/012
[52] U.S. Cl. ................................. 360/97.01; 360/104
[58] Field of Search ............................... 360/103–104, 360/106, 109, 98.01, 97.01

[56] References Cited

U.S. PATENT DOCUMENTS

| | | | |
|---|---|---|---|
| 4,814,908 | 7/1988 | Schmitz | 360/77.02 |
| 4,853,811 | 8/1989 | Brooks, Jr. et al. | 360/103 |
| 5,012,368 | 4/1991 | Bosier et al. | 360/104 |
| 5,055,969 | 10/1991 | Putnam | 360/104 X |

FOREIGN PATENT DOCUMENTS

| | | | |
|---|---|---|---|
| 0344366 | 12/1989 | European Pat. Off. | 360/104 |
| 55-25803 | 2/1980 | Japan | 360/104 |
| 1-184682 | 7/1989 | Japan | 360/109 |

*Primary Examiner*—John H. Wolff
*Attorney, Agent, or Firm*—Haugen and Nikolai

[57] ABSTRACT

A rotary actuator for a disk drive includes a pivotally mounted carriage and a stacked arrangment of magnetic transducer support arms extended away from the carriage, each arm supporting a magnetic transducing head at its free end for arcuate travel as the carriage pivots. A circuit board, for connecting the transducing heads to read, write and control circuitry, is mounted along one side of the head arm assembly, secured to the carriage. A section of the circuit board extends away from the carriage in cantilever fashion toward the transducing heads. A preloaded retaining spring is secured to the carriage on the opposite side of the circuit board from the carriage, and includes a plurality of load arms that bear against the cantilevered portion of the circuit board, continually biasing the board, and an electrically insulative spacer mounted to the board, against the transducer support arms.

18 Claims, 3 Drawing Sheets

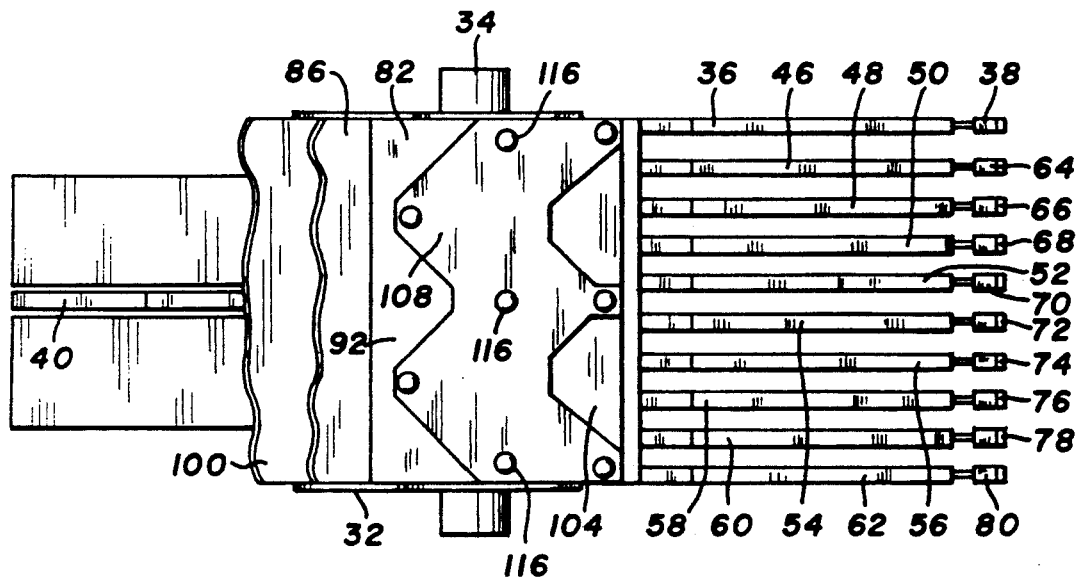
FIG.3
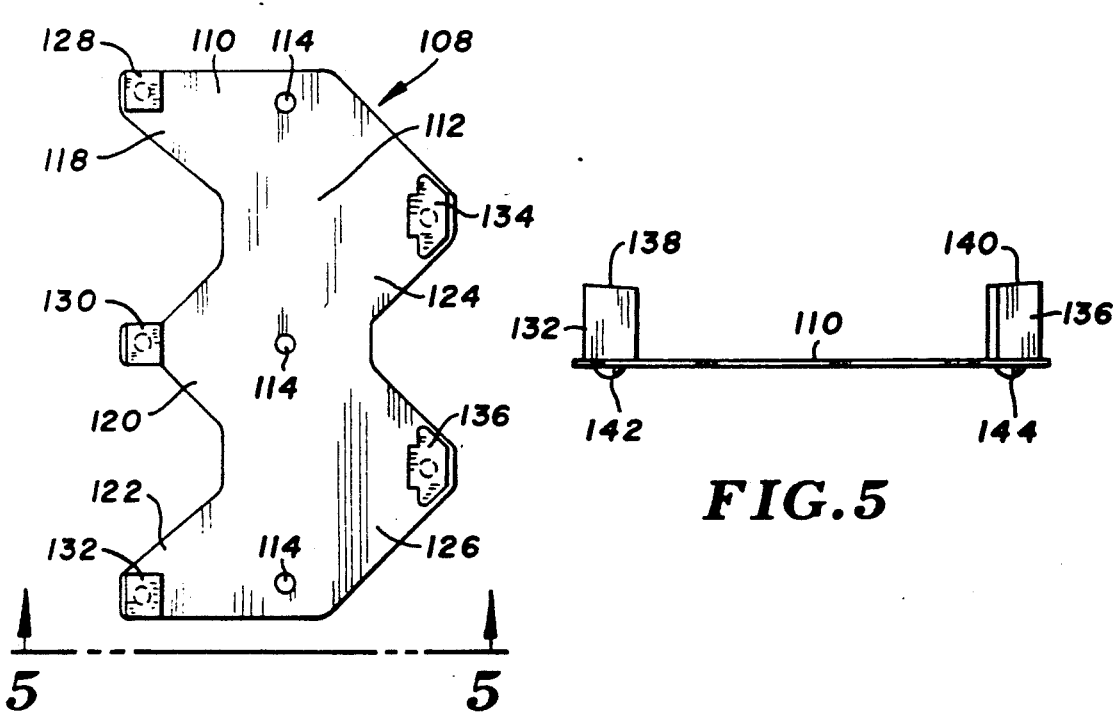
FIG.4
FIG.5

1

FLEXIBLE RETAINER FOR CANTILEVERED MATRIX BOARD

BACKGROUND OF THE INVENTION

The present invention relates to magnetic disk drive data storage devices with multiple disks stacked on a spindle, and more particularly to rotary actuators for such devices and the mounting of certain electrical circuitry on the actuators.

Designers of computer data storage products are well aware of the constant effort to improve data storage efficiency, particularly in terms of increasing the amount of data stored in a limited physical space to enhance data storage capacities. This goal is well served by disk drives having multiple rigid disks on a spindle, axially aligned in a stack for simultaneous rotation. These drives typically include rotary actuators to read and record data. The rotary actuator includes a pivotally mounted carriage, with multiple transducer support arms extended radially of the carriage and supporting data transducers at their free ends. As the carriage pivots, the transducers are carried arcuately, and generally radially relative to data recording surfaces of the disks.

Typically, one of the recording surfaces is dedicated to storage of servo positioning information. The transducer associated with this surface provides rotary actuator position information used by the remaining transducers when reading and recording data on their associated recording surfaces.

Traditionally, the electrical circuitry used in reading and recording data is mounted on each support arm near the associated transducer. As stacks of disks and rotary actuators become more compact, and as improved manufacturing techniques have enabled the manufacture of unitary head arm assemblies incorporating the carriage and arms, the traditional mounting of the circuitry has become correspondingly more difficult. U.S. Pat. application Ser. No. 07/569,818, filed Aug. 20, 1990 and assigned to the assignee of the parent application, discloses a circuit board mounted to the carriage parallel to the actuator pivot axis. The circuit board, frequently referred to as a matrix board, cooperates with multiple transducers through multiple conductors. This board replaces multiple preamp circuits mounted on each arm, thus to substantially reduce manufacturing cost. A portion of the circuit board extends away from the carriage along one side of a stack of transducer support arms. This extension along the arms is desirable, in that noise is reduced as the circuitry is disposed nearer to the transducers. The section of the circuit board extended along the support arms behaves as a cantilever. It is not fixed to the arms, although it may contact the arms. The result is a tendency of the extended section to vibrate, become separated from the support arms and then collide with the arms, whenever the head arm assembly is rapidly accelerated or decelerated during normal head positioning, particularly track seeking.

Another improvement concerning head positioning in rotary actuators is disclosed in U.S. Pat. No. 4,814,908 (Schmitz). A heating element is embedded along at least one of the side edges of a transducer support arm. Selected application of heat to the heating element results in a controlled linear expansion of the support arm, for slight (microinch range) arcuate movement of a transducer carried by the arm. This affords a micro-positioning adjustment for improved track following.

As disclosed in the aforementioned U.S. Pat. application Ser. No. 07/569,818, the micro-positioning improvement can be utilized with a stack of transducer support arms, by mounting a flex circuit along the carriage, between the carriage and the circuit board devoted to data reading and recording operations. Electrically insulative spacer separate the flex circuit from the carriage, and on the flex circuit, from the circuit board. To ensure adequate heat dissipation and to ensure that heat from the circuit board does not interfere with the operation of individual heating elements along the support arms, the circuit board is maintained spaced apart from the arms, which of course increases the tendencies of circuit board vibration and impact against the transducer support arms, both of which are detrimental to transducer positioning accuracy.

Therefore, it is an object of the present invention to provide a rotary actuator in which a read/write circuit package is mounted along a head arm assembly, with a section of the package extended away from the carriage along the transducer support arms in cantilever fashion, yet positively maintained against the support arms.

Another object is to provide a magnetic disk drive rotary actuator in which the read/write circuit is maintained in a stable, contacting and non-fixed relation to a plurality of transducer support arms.

Yet another object is to provide a means for supporting a read/write circuit package and a heating element control circuit package along one side of a rotary actuator including multiple stacked transducer support arms, in which these circuit packages are spaced apart from one another yet positively maintained against vibration and shock due to impact of either circuit against the transducer support arms.

SUMMARY OF THE INVENTION

To achieve these and other objects, there is provided a rotary actuator for a disk drive. The actuator includes a carriage mounted to pivot about a pivot axis relative to a stationary disk drive frame. A plurality of transducer support arms extend away from the carriage in cantilever fashion. The support arms have end portions remote from the base to support magnetic transducing heads for arcuate travel as the carriage pivots. The support arms are mounted in spaced apart and stacked relation to one another with respective side edges substantially aligned with one another. The actuator has an electrical circuit package. A mounting means is provided for securing the circuit package to the carriage, with a section of the package extending away from the carriage along the support arms adjacent the respective side edges. A biasing means is mounted with respect to the carriage, for continually urging the extended section toward and against the arms to maintain the section in surface contact with the side edges.

The preferred biasing means is a unitary flat spring constructed of spring steel. A medial region of the spring is fixed with respect to the base. A plurality of load arms, extended away from the medial region along the support arms, bear upon the extended section to maintain it against the arms. A plurality of stabilizing arms extend in the opposite direction away from the medial region. Each stabilizing arm has a higher spring constant than each of the load arms. The stabilizing arms provide stability and a holding force approximately equal to the force of the load arms. The flexure in the load arms is sufficient to accommodate the circuit package as the load arms continually urge the package toward the support arm side edges. More particularly, the load arm force is stable over a range of load arm flexure, to accommodate dimensional variations (particularly in thickness) among circuit packages.

The mounting means includes an electrically insulative first spacing means between the circuit package and the carriage, and a second spacing means between the circuit package and the spring. The preferred second spacing means is a plurality of spacer members removably secured to the carriage for maintaining the circuit package, and a plurality of threaded fasteners, one threadedly secured to each spacer member, for securing the spring. Through this arrangement the spring is maintained spaced apart from the circuit package, in a manner that permits removal of the spring without removing or otherwise disturbing the circuit package.

The rotary actuator can include electrically conductive heating elements along the respective side edges of the support arms, and a flexible circuit electrically connected to the heating elements and mounted with respect to the carriage between the first spacing means and the circuit package. A third spacing means then is provided between the flexible circuit and the carriage. Contact pads, at the end of the circuit package remote from the carriage, maintain the circuit package spaced apart from the side edges. Consequently, heat generated in the read/write circuitry is dissipated from the circuit package in a manner that does not interfere with operation of the individual heating elements.

Thus, in accordance with the present invention a circuit package for data reading and recording is fixed to a carriage of a head arm assembly, and extends along multiple stacked arms of the assembly in cantilever fashion and spaced apart sufficiently for heat dissipation, yet in a manner which substantially eliminates circuit package vibration or impact against the transducer support arms.

IN THE DRAWINGS

For a further understanding of the above and other features and advantages, reference is made to the following detailed description and to the drawings, in which:

FIG. 3 is forward elevation of the head arm assembly in FIG. 2;

FIG. 4 is an enlarged rear elevation of a flexible retainer of the head arm assembly in FIG. 3;

FIG. 5 is an end view of the retainer;

DETAILED DESCRIPTION OF THE PREFERRED EMBODIMENTS

Figure 1:
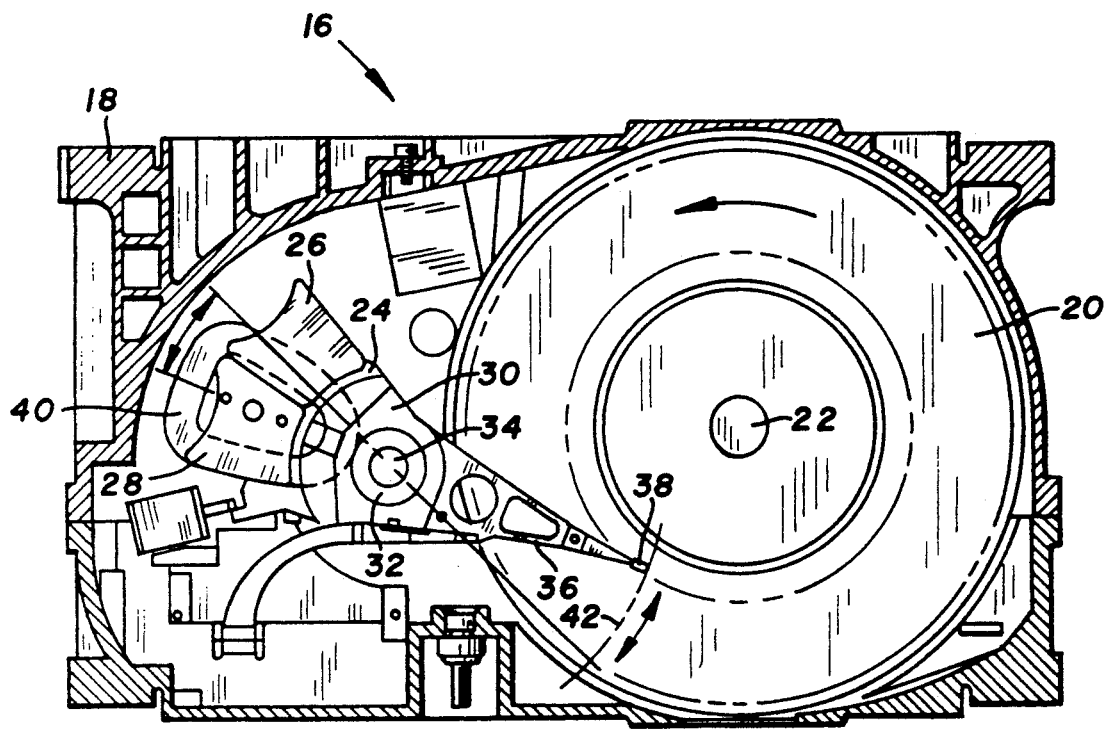
FIG. 1 is a top plan sectioned view of a magnetic disk drive having a rotary actuator constructed in accordance with the present invention.

Turning now to the drawings, there is shown in FIG. 1 a magnetic disk drive 16 including a deck 18 which is a part of a stationary frame or housing for the disk drive. A stack of magnetic data storage disks, the top one of which is shown at 20, is mounted on a spindle 22 to rotate relative to the deck on a vertical axis, counter clockwise as viewed in the figure. Also mounted on deck 18 is rotary actuator 24 for controllably and variably positioning magnetic transducing heads relative to data recorded on the disks. Rotary actuator 24 includes permanent magnets 26 and 28, both of which are fixed relative to deck 18. The actuator further includes a head arm assembly 30 mounted to pivot relative to the deck about a vertical pivot axis. More particularly, the head arm assembly includes a carriage 32 mounted pivotally onto an actuator shaft 34. A stack of multiple transducer support arms, the top one being shown at 36, extend from the carriage radially of shaft 34. A magnetic transducing head 38 is supported at the free end of arm 36, remote from the actuator shaft. An actuator coil 40 extends radially of the shaft, in a direction opposite to that of support arm extension. Actuator coil 40 is formed of one of more windings of electrically conductive wire. In a manner well known and thus not further discussed here, electrical current is selectively introduced into coil 40 to form a magnetic field about the coil. The coil field interacts with the magnetic fields of magnets 26 and 28, to pivot the head arm assembly and thus carry transducing head 38, as well as other transducers on the other support arms, in an arcuate path relative to the magnetic disks. As seen at 42, this arcuate path is approximately radial with respect to disk 20, such that transducing head 38 can be aligned with any one of multiple concentric data tracks 44 indicated on the surface of disk 20.

Figure 2:
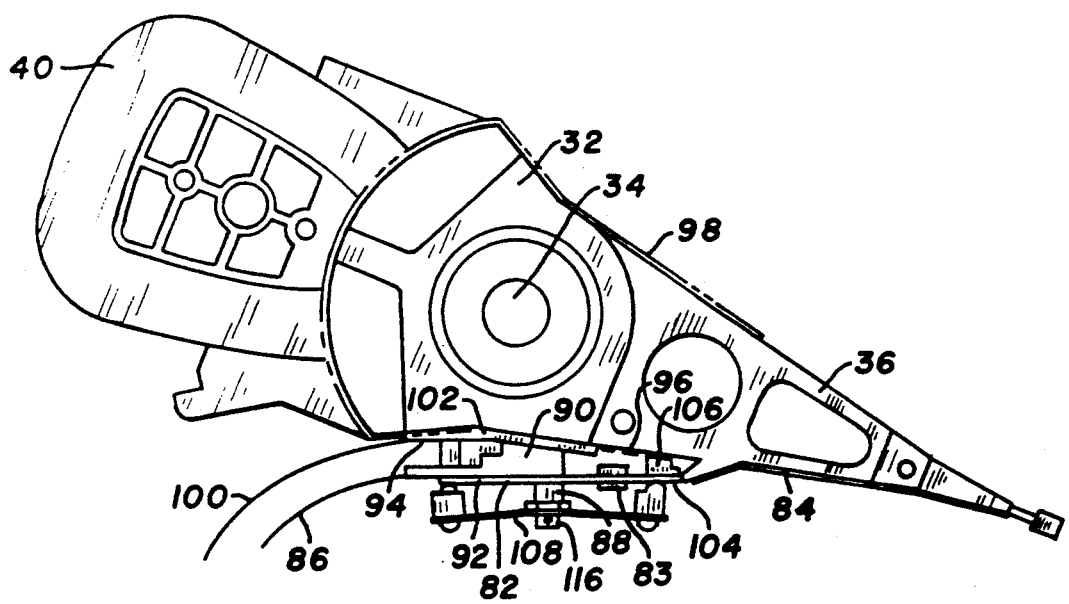
FIG. 2 is an enlarged top plan view of a head arm assembly of the rotary actuator shown in FIG. 1.

FIGS. 2 and 3 illustrate the head arm assembly of actuator 24 removed from the disk drive. The head arm assembly includes a plurality of transducer support arms 46-62 in addition to top support arm 36. Arms 46-62 are aligned with the top arm, and thus are not visible in FIG. 2. All of the support arms are integral with carriage 32 and rotate in concert as the carriage pivots on shaft 34. A plurality of transducing heads 64-80 are mounted respectively to support arms 46-62, each head at the end portion of the arm remote from carriage 32. All of the transducing heads traverse arcuate path 42 as the carriage pivots.

One of the transducing heads, e.g. head 70, is a servo head used to read servo position information recorded on its associated one of the magnetic disks as the disks rotate. The resulting information is used to determine the position of head 70 radially of the disks, and the radial positions of the remaining transducing heads. These remaining transducers read and record data on their associated disks, utilizing the servo position information in a known manner.

Electrical circuitry is provided for causing each of the data transducers to generate an appropriate and properly timed signal for storing data on its associated disk, and further for transmitting electrical signals generated by the transducer when reading previously recorded data, whether working data or servo positioning data.

Part of the electrical circuitry is provided in the form of an electrical package or circuit board 82 mounted along one side of head arm assembly 30. Circuitry, mounted on an electrically insulative substrate to form board 82, includes data reading and writing paths, read and write control paths, data preamplifiers, power lines and ground lines. The circuit includes a plurality of preamplifiers as indicated at 83. A conductor 84 along arm 36, and similar conductors along remaining support arms 46–62, electrically associate the transducers with the circuit board. A flexible electrical cable 86 associates the circuit board with read and write control circuitry (not shown).

Three circuit board fasteners, one of which is shown at 88 in FIG. 2, removably secure circuit board 82 to carriage 32. An electrically insulative spacer 90 accommodates fasteners 88 and supports the circuit board, particularly along a proximal section 92 adjacent the carriage. Spacer 90 can be formed, for example, from a resin available from General Electric under the brand name "Ultem 1000", although other hard, tough plastics are suitable.

A flexible electrical circuit 94 is disposed between spacer 90 and the carriage. A plurality of heating elements are electrically coupled to flexible circuit 94, with heating elements on both sides of the support arms as indicated at 96 and 98 in connection with support arm 36. A flexible electrical cable 100 couples the flexible circuit to heating control circuitry (not shown). The heating control circuitry selectively heats the elements associated with each arm to cause controlled expansion along a selected side of each arm, to slightly adjust the position of the associated transducing head (e.g. by a few microinches) for more accurate track following. For further information concerning these heating elements, reference is made to the aforementioned U.S. Pat. No. 4,814,908.

A spacer 102 is positioned between flexible circuit 94 and carriage 32. Fasteners 88 thus anchor circuit board 82, flex circuit 94, and spacers 90 and 102 to the carriage.

As seen in FIG. 2, a distal section 104 of the circuit board extends along the transducer support arms, away from spacer 90 and the carriage, toward the transducing heads. An elongate insulating spacer 106, secured to the circuit board, maintains the circuit board spaced apart from the support arms. This provides clearance between the circuit board and arms, to accommodate circuit components mounted on the board. Spacer 106 is not fixedly secured to the arms, as a secure mounting would interfere with the micro adjustment of the transducing heads through control of the heating elements. As a result, section 104 of circuit board 82, along with the conductive pads, tends to momentarily move away from the support arms in response to the rapid accelerations and decelerations of the head arm assembly during track seeking operations. The resultant vibrations and impact against the support arms can impair transducer positioning accuracy.

Accordingly, a flexible retainer 108 is secured in spaced apart relation to the circuit board, and provides a biasing force that maintains the circuit board position by urging spacer 106 against the transducer support arms.

Figures 6, 7:
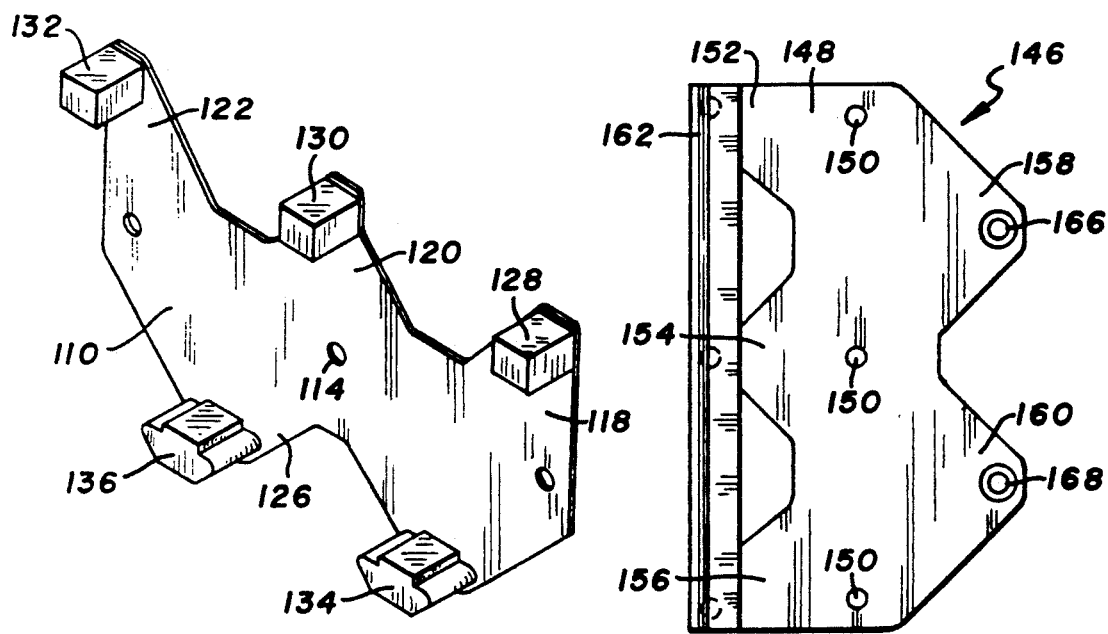
FIG. 6 is a perspective view of the retainer.
FIG. 7 is a rearward elevation of a flexible retainer according to a second embodiment of the invention.

Flexible retainer 108 is shown in greater detail in FIGS. 4–6. The retainer includes a thin, flat leaf spring 110 preferably constructed of spring steel. The spring includes a medial region 112 that spans the spring vertically in viewed in FIG. 4. Three apertures 114 are formed through the spring in the medial region, for accommodating three fasteners 116 (FIG. 3), each threaddedly engaged in one of circuit board fasteners 88. Spring 110 further includes three load arms 118, 120 and 122 extended away from the medial region in the direction toward the transducing heads. Two stabilizing arms at 124 and 126 extend in the opposite direction from the medial region. Three rectangular load arm pads are secured to the load arms as indicated at 128, 130 and 132. Likewise, stabilizing pads 134 and 136 are mounted to the respective stabilizing arms. All of the pads are resilient and flexible, and preferably are formed of a fluorocarbon available from 3M Company under the brand name "Fluorel".

As seen in FIG. 5, inward facing surfaces of the load arm pads and stabilizing pads, indicated respectively at 138 and 140, are not parallel, but inwardly and downwardly inclined as viewed in FIG. 5. When spring 110 is secured, however, the spring is elastically deformed and is convex toward the carriage. With the retainer in this configuration, inward surfaces 138 and 140 are substantially parallel. The load arm pads and stabilizing arm pads are each secured to the leaf spring through a vulcanizing process, in which the pad and a retaining bead are formed simultaneously on opposite sides of spring 110, and linked by a cylindrical portion of pad material extending through an opening formed in the spring. Beads 142 and 144 are shown in FIG. 5 in connection with pads 132 and 136, respectively. Spring 110 has a "normal" planar configuration when under no external stress as indicated in FIG. 5. When the spring is secured along its medial region against fasteners 88, the spring is elastically bent and exerts force upon circuit board 82 through the load arm pads and stabilizing arm pads. The flexible pads, individually connected to each of the load arms and stabilizing arms, are usually preferred, as they have relatively large inward surfaces in contact with the circuit board and substantially conforming to the shape of the circuitry and substrate that they engage to avoid pressure concentrations.

The load arms and stabilizing arms are shaped to provide a desired spring constant in each, which of course also depends upon the thickness of the spring and the material selected. More particularly, stabilizing arms 124 and 126, in view of the greater span of each in the vertical direction as viewed in FIG. 4, cooperate to provide a spring force approximately equal to the collective spring force of load arms 118, 120 and 122. With the spring anchored along the medial region, sufficient spring flexure occurs along the load arms to accommodate variations in circuit board thickness. Due to the flexure, a substantial force results from the elastic deflection of the load arms, for a holding force against the circuit board of approximately 3.5 pounds in the present embodiment.

Figure 8:
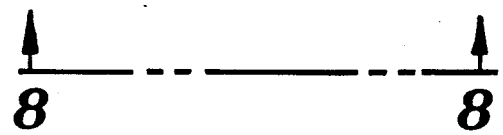
FIG. 8 is an end view of the retainer in FIG. 7.

FIGS. 7 and 8 illustrate a retainer 146 employed in accordance with an alternative embodiment of the invention. A leaf spring 148 of the retainer is substantially identical to leaf spring 110, with a medial region, fastening apertures 150 running along the medial region, three load arms 152, 154 and 156, and two stabilizing arms 158 and 160. In lieu of the load arm pads, a load bar 162 spans the spring and is secured to all three of the load arms by threaded fasteners indicated at 164. A rounded surface 166, semi-circular in cross section, bears against circuit board 82 when spring 148 is secured in place. Bar 162 preferably is constructed of a hard plastic, for example as sold under the brand name "Lexan". A pair of contact members 166 and 168 are secured to the stabilizing arms in lieu of flexible pads, and likewise can be constructed of a hard plastic. Hemispherical contact surfaces 170 of the contact members bear against section 104 of the circuit board when the spring is in place. Load bar 162 stabilizes the load arms with respect to one another, but lacks the flexibility of the individual load pads in conforming to the circuit board.

Figure 9:
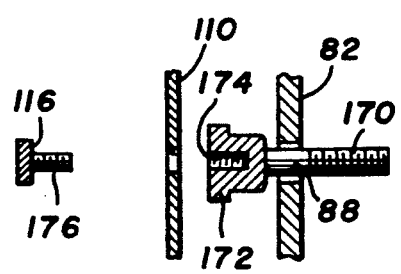
FIG. 9 is a sectional view of a spacing member and an associated threaded fastener used in mounting the spring and a circuit package spaced apart from the spring.

FIG. 9 shows one of circuit board fasteners 88 and threaded fasteners 116 in greater detail. Fastener 88 has an externally threaded shank 170 for threaded engagement with one of three internally threaded openings in carriage 132. An enlarged head 172 of the fastener bears against circuit board 82 to retain the circuit board, as well as spacers 90 and 102 and flexible circuit 94 with respect to the carriage. Head 172 includes an internally threaded opening 174 for receiving an externally threaded shank 176 of fastener 116. Accordingly, spring 110 (or spring 148) can be removed from the remainder of the assembly for inspection or repair, without disturbing the electrical circuitry or the spacers. Initial assembly likewise is facilitated with this arrangement.

Circuit board fasteners 88, by virtue of the length of heads 172, determine the spacing between circuit board 82 and spring 110 once fasteners 116 are tightened. This predetermined spacing, in combination with the prebiasing of the leaf spring and shape of the load arms, determines the amount of force applied to the circuit board to maintain the board and insulative spacer 106 against the transducer support arms.

Thus, according to the invention a circuit board or other electrical package including data read/write circuitry and control circuitry can be secured to a rotary actuator carriage, and extend in cantilever fashion along a stack of transducer support arms. The circuit board is continually biased against the arms, such that the cantilevered section and insulative spacer do not separate from the support arms, even during extreme accelerations and decelerations of the head arm assembly. The fasteners for the circuit board and spring facilitate assembly of the actuator and subsequent disassembly for inspection or repair. A flexible circuit for controlling arm-mounted heating elements can be mounted to the carriage, electrically and physically isolated from the circuit board, with the board spaced apart from the heating elements so as not to interfere with the function of the heating elements.

What is claimed is:

1. A rotary actuator for a disk drive including:
a substantially rigid carriage mounted to pivot on a pivot axis relative to a stationary disk drive frame;
a plurality of transducer support arms extended away from the carriage in cantilever fashion and having respective end portions remote from the carriage to support a plurality of magnetic transducing heads, respectively, for arcuate travel as the carriage pivots, said support arms being arranged in spaced apart and stacked relation to one another with respective side edges of the arms substantially aligned with one another;
an electrical circuit package, and a fastening means for securing the electrical circuit package with respect to the carriage, with a cantilevered package section of the electrical circuit package extended in cantilever fashion away from the carriage and along the support arms adjacent the side edges;
a plurality of electrical conductors, each said conductor electrically coupling one of the transducing heads with the electrical circuit package; and
a biasing means mounted with respect to the carriage, for continually urging the cantilevered package section toward and against the support arms to maintain the cantilevered package section in surface contact with the side edges while allowing movement of the cantilevered package section with respect to said side edges.

2. The rotary actuator of claim 1 wherein:
said electrical circuit package includes electrical circuitry, a dielectric substrate and an electrically insulative spacer between the cantilevered package section and the support arms.

3. The rotary actuator of claim 2 wherein:
the biasing means is fixedly secured with respect to the carriage on an opposite side of the electrical circuit package from the carriage, and includes a flexible load applying means for bearing upon the cantilevered package section.

4. The rotary actuator of claim 3 wherein:
the load applying means comprises a plurality of flexible load arms and a plurality of resilient, electrically insulative pads, each insulative pad carried by an associated one of the load arms and compressed against the cantilevered package section by its associated load arm.

5. The rotary actuator of claim 3 wherein:
said load applying means comprises a plurality of load arms and an insulative load bar mounted to the load arms and urged against the cantilevered package section by the load arms.

6. The apparatus of claim 2 wherein:
the biasing means comprises a unitary flat spring having a medial region fixedly secured with respect to the carriage on an opposite side of the electrical circuit package from the carriage, a plurality of load arms extended away from the medial region and along the cantilevered package section, and a plurality of stabilizing arms extended from the medial region in a direction away from the load arms.

7. The rotary actuator of claim 6 wherein:
the load arms apply a spring force of a first magnitude to the cantilevered package section, and the stabilizing arms together apply a spring force of a second magnitude substantially balancing the first spring force.

8. The rotary actuator of claim 6 further including:
a mounting means for fixing the medial region with respect to the carriage, wherein the mounting means comprises an electrically insulative first spacing means between the electrical circuit package and the carriage, and a second spacing means between the electrical circuit package and the biasing means, said biasing means comprising a unitary flat spring.

9. The rotary actuator of claim 8 wherein:
the second spacing means includes a plurality of spacer members removably secured to the carriage.

10. The rotary actuator of claim 9 wherein:
the mounting means further includes a plurality of threaded fasteners, one threadedly engaged within each of the spacer members.

11. The rotary actuator of claim 8 further including:
a plurality of electrically conductive heating elements disposed along the side edges, and a flexible circuit electrically associated with the heating elements and disposed between the first spacing means and the carriage.

12. The rotary actuator of claim 11 further including:
a third spacing means disposed between the flexible circuit and the carriage.

13. An apparatus for securing a circuit board to an actuator head arm assembly including a substantially rigid carriage and a plurality of transducer support arm extended away from the carriage in cantilever fashion, spaced apart and in stacked relation to one another with respective side edges substantially aligned with one another; said apparatus including:

- an electrical circuit package including an electrically insulative substrate and electrical circuitry supported on the substrate;
- an electrical insulative first spacing means between the electrical circuit package and the carriage;
- a spring means, and a second spacing means between the electrical circuit package and the spring means; and
- a fastening means for securing the first and second spacing means, the electrical circuit package and the spring means with respect to the carriage to position the circuit package such that a section of the package extends away from the carriage in cantilever fashion and along the support arms adjacent the side edges, and wherein the spring means is positioned to continually urge the extended package section toward and against the arms to maintain the extended package section in surface engagement with the side edges while allowing the extended package section to move relative to the side edges.

14. The apparatus of claim 13 wherein: said electrical circuit package is a circuit board.

15. The apparatus of claim 14 wherein:
the spring means includes a unitary flat spring comprising a medial region fixedly secured with respect to the carriage by the fastening means, a plurality of load arms extended along the extended package section, and a plurality of stabilizing arms extended from the medial region in a direction opposite to the extension of the load arms.

16. The apparatus of claim 15 wherein:
the load arms together apply a first spring force having a first magnitude to the extended package section, and the stabilizing arms apply a second spring force substantially balancing the first spring force.

17. The apparatus of claim 16 wherein:
the second spacing means includes a plurality of spacer members removably secured to the carriage, and the fastening means include a plurality of threaded fasteners, one fastener secured to each of the spacer members.

18. The apparatus of claim 17 further including:
a plurality of electrically conductive heating elements disposed along the side edges, a flexible circuit electrically connected to the heating elements and disposed between the first spacing means and the carriage, and a third spacing means between the flexible circuit and the carriage.

* * * * *